United States Patent
Snover

(10) Patent No.: US 6,438,716 B1
(45) Date of Patent: Aug. 20, 2002

(54) COMPOSITION OF ERROR MESSAGES IN AN ERROR MESSAGE SYSTEM BASED UPON NON-LOCAL CONTEXTUAL INFORMATION

(75) Inventor: Jeffrey Phillip Snover, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/177,032

(22) Filed: Oct. 22, 1998

(51) Int. Cl.⁷ .................................................. G06F 3/14
(52) U.S. Cl. ........................................ 714/57; 714/48
(58) Field of Search ...................................... 714/48–57

(56) References Cited

U.S. PATENT DOCUMENTS

| | | | | |
|---|---|---|---|---|
| 4,339,657 A | * | 7/1982 | Larson et al. | |
| 4,615,002 A | * | 9/1986 | Innes | |
| 4,800,563 A | * | 1/1989 | Itagaki et al. | |
| 4,805,134 A | | 2/1989 | Calo et al. | |
| 5,121,475 A | * | 6/1992 | Child et al. | |
| 5,195,031 A | | 3/1993 | Ordish | |
| 5,463,768 A | * | 10/1995 | Cuddihy et al. | |
| 5,491,796 A | | 2/1996 | Wanderer et al. | |
| 5,511,164 A | * | 4/1996 | Brunmeier et al. | |
| 5,537,546 A | | 7/1996 | Sauter | |
| 5,539,877 A | * | 7/1996 | Winokur et al. | |
| 5,630,125 A | | 5/1997 | Zellweger | |
| 5,740,354 A | * | 4/1998 | Ben-Natan et al. | |
| 5,892,896 A | * | 4/1999 | Shingo | |
| 5,974,568 A | * | 10/1999 | McQueen | |
| 6,000,046 A | * | 12/1999 | Passmore | |
| 6,052,525 A | * | 4/2000 | Carlson et al. | |
| 6,067,444 A | * | 5/2000 | Cannon et al. | |
| 6,069,760 A | * | 5/2000 | Yun | |
| 6,128,017 A | * | 10/2000 | Alimpich et al. | |
| 6,269,460 B1 | * | 7/2001 | Snover | 714/48 |

FOREIGN PATENT DOCUMENTS

| | | |
|---|---|---|
| EP | 0816991 | 7/1998 |
| WO | 9633453 | 4/1996 |

* cited by examiner

Primary Examiner—Paul R. Myers
(74) Attorney, Agent, or Firm—Duke W. Yee; Jeffrey S. LaBaw; David H. Judson

(57) ABSTRACT

A method of composing and displaying unique error messages is operative in a computer system having an error message subsystem. The error message subsystem is driven by non-contextual information, e.g., a set of previous error conditions, together with a current error condition. If the current error condition has the non-contextual information associated therewith, an error message is composed that is a function of the current error condition and the non-contextual information. Driving the error message subsystem in this manner provides a more robust and useful error messaging service.

31 Claims, 4 Drawing Sheets

US 6,438,716 B1

COMPOSITION OF ERROR MESSAGES IN AN ERROR MESSAGE SYSTEM BASED UPON NON-LOCAL CONTEXTUAL INFORMATION

BACKGROUND OF THE INVENTION

1. Technical Field

The present invention relates in general to a method and system for data processing and, in particular, to an improved method and system of user interface to a data processing system. Still more particularly, the present invention relates to an improved method and system for generating and displaying error messages based upon non-local contextual information.

2. Description of the Related Art

Computer systems issue and display error messages when abnormal conditions occur. A common display technique is to present a message on a display interface (e.g., a GUI) that tells the user what went wrong and what he or she might do to address the error. In some cases, these messages are generated by the program itself. More often, a separate error message subsystem is used to dynamically load error messages from an external source (e.g., a database) into the program. Such error handling is used to facilitate localization of the product or to allow the error message subsystem to be enhanced or supported without requiring a given application (that uses the subsystem) to be recompiled, retested, and rereleased. Providing error messages in this fashion is sometimes referred to local context information messaging as the particular error message returned is uniquely associated with some particular "local" state or action.

In such known program-based or error message subsystem-based techniques, a given error message thus is composed as a function of local state or contextual information. Thus, for example, a given error message template (e.g., "file_not found") is refined with particular local context information associated with the current error. Thus, assume the user desires to locate a file c:\txt supported in disk storage. If that file cannot be located, the error message template "file (_) not found" is refined as "file (c:\foo.txt) not found").

In such known error messaging techniques and systems, there is a 1:1 correspondence between a given error and a given error message returned upon occurrence of the given error. This technique affords limited flexibility and does not allow an application or system provider to customize error messages based upon non-local or other contextual information.

The present invention provides a solution to the inherent limitations of the prior art.

BRIEF SUMMARY OF THE INVENTION

A primary object of the present invention is to compose and display a unique error message when a current error condition has associated therewith a prior error condition. The association between the current error condition and the prior error condition preferably is user- or system-selectable via an error mapper interface.

Another object of this invention is to control an existing error message subsystem with non-contextual input information to thereby generate custom error messages when a current error condition correlates with predefined, prior error conditions.

A still further object of this invention is to provide an "intelligent" error messaging system and method wherein the composition of a given error message is preferably based upon user-defined or system-defined contextual information.

It is still another important object of this invention to evaluate the context in which a given error has occurred to determine an appropriate error message to present to the user.

These and other objects of the present invention are provided in a computer system having an error message subsystem. A preferred method begins by associating non-local contextual information with a given error condition. The non-local contextual information, for example, may be information about previous error conditions. Preferably, this association is effected using a graphical user interface mapper. During a run-time operation, the method waits for the occurrence of a current error condition. Upon such occurrence, a determination is made regarding whether the current error condition is the given error condition. If so, the routine composes an error message that is a function of the current error condition and the non-local contextual information. The error message is then displayed or otherwise output to the user.

The inventive method may be implemented in computer software as part of or an adjunct to an error message subsystem. According to the invention, the error message subsystem is driven by non-contextual information, e.g., a set of previous error conditions, together with a current error condition. If the current error condition has the non-contextual information associated therewith, an error message is composed that is a function of the current error condition and the non-contextual information. Driving the error message subsystem in this manner provides a more robust and useful error messaging service.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
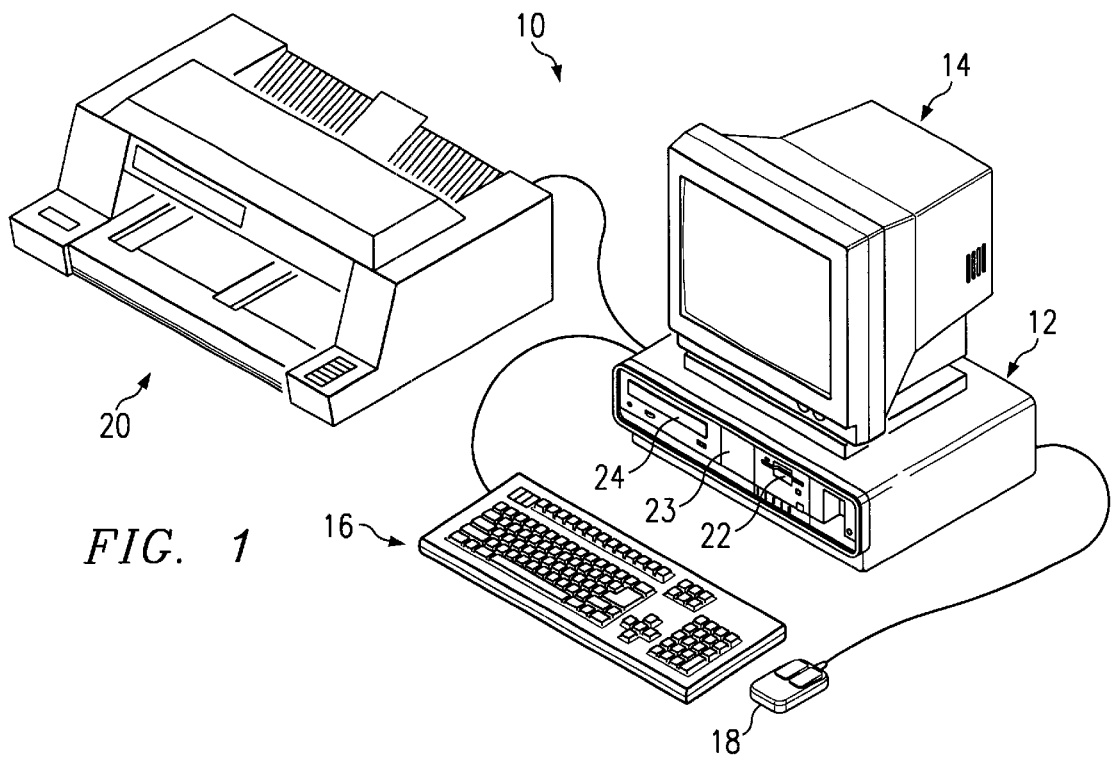
FIG. 1 is a pictorial representation of a data processing system which may be utilized to implement the method and system of the present invention.

With reference now to the figures and in particular with reference to FIG. 1, there is illustrated a preferred embodiment of a computer in which the present invention is implemented. As illustrated, data processing system 10 includes system unit 12, display device 14, keyboard 16, mouse 18, and printer 20. System unit 12 receives data for processing from input devices such as keyboard 16, mouse 18, or local area networking interfaces (not illustrated). Mouse 18 is preferably utilized in conjunction with a graphical user interface (GUI) in which hardware and software system objects, including data processing system components and application programs, are controlled through the selection and manipulation of associated graphical objects displayed within display device 14. Although data processing system 10 is illustrated with mouse 18, those skilled in the art will recognize that other graphical pointing devices, including a graphics tablet, stylus, light pen, joystick, puck, trackball, trackpad, and the IBM TrackPoint™ can also be utilized. Data processing system 10 presents output data to a user via display device 14 and printer 20. To support storage and retrieval of data, system unit 12 further includes diskette drive 22, hard disk drive 23, and CD-ROM drive 24, which are connected to system unit 12 in a well-known manner. Of course, those skilled in the art are aware that other conventional components can also be connected to system unit 12.

Figure 2:
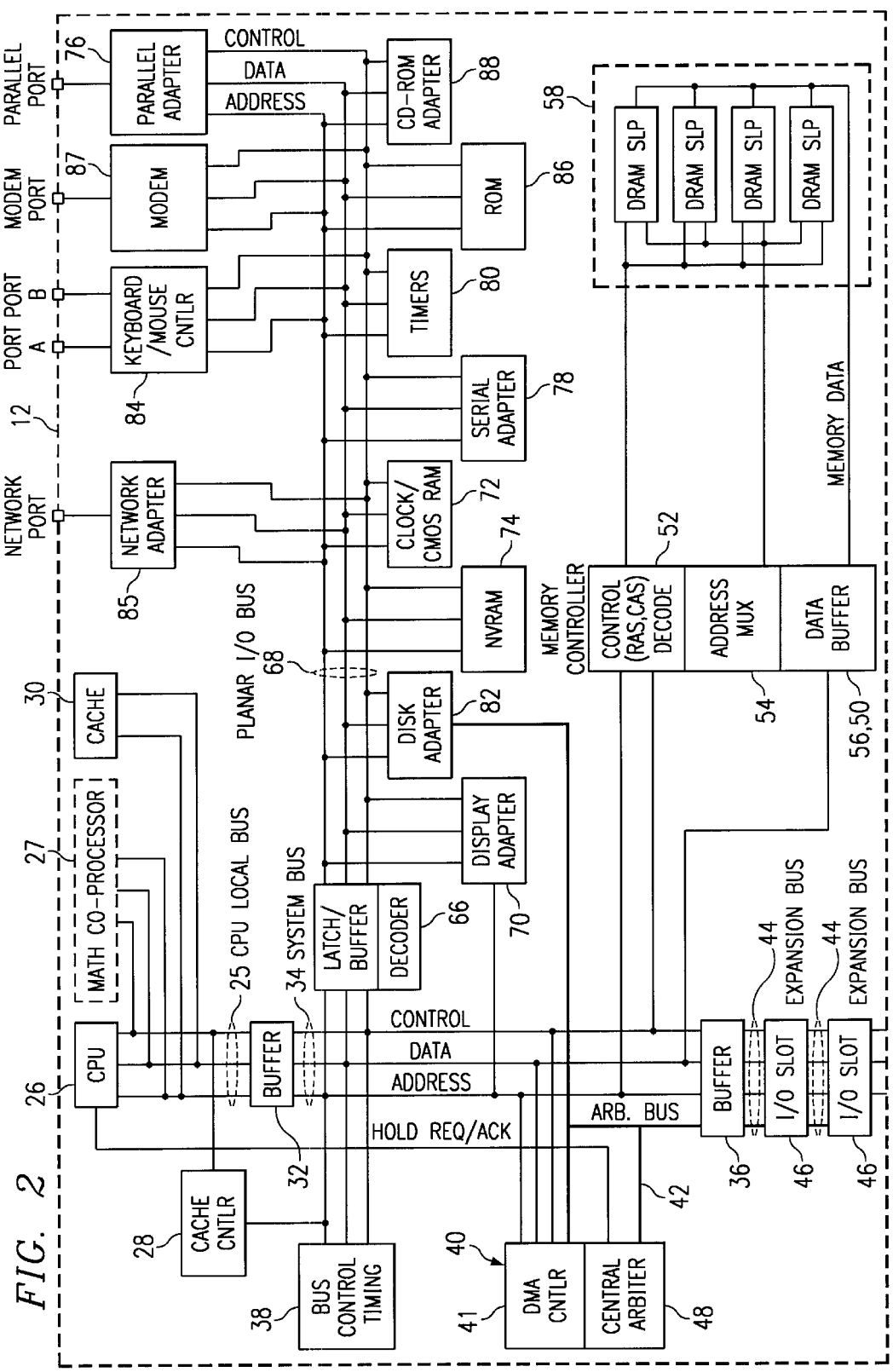
FIG. 2 depicts a block diagram of the system unit of the data processing system illustrated in FIG. 1.

Referring now to FIG. 2, there is depicted a block diagram of the principal components of system unit 12 of data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 can be implemented as one of the x86-type microprocessors, which are available from a number of vendors such as Intel. In addition to CPU 26, an optional math coprocessor 27, cache controller 28, and cache memory 30 are coupled to high-speed CPU local bus 25. Math coprocessor 27 is an optional processor, distinct from CPU 26, that performs mathematic computations with greater efficiency than CPU 26. Math coprocessor 27 is optional since the performance advantage provided by a math coprocessor may be achieved by enhancements to CPU 26, such as the implementation of multiple floating-point execution units. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to expansion bus 44 by control signals transmitted via arbitration control bus 42.

CPU 26 accesses data and instructions from and stores data to volatile random access memory {RAM) 58 through memory controller 50, which comprises memory control unit 50, address multiplexer 54, and data buffer 56. RAM 58 includes an error message handler 59 that provides the inventive functionality of the present invention described below. Memory control unit 52 generates read enable and write enable signals to facilitate storage and retrieval of data and includes address translation facilities that map virtual addresses utilized by CPU 26 into physical addresses within RAM 58. RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within nonvolatile storage devices 22–24. Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process.

Still referring to FIG. 2, buffer 36 provides an interface between system bus 34 and expansion bus 44. Connected to expansion bus 44 are a number of I/O slots 46 for receiving adapter cards which may be further connected to an I/O device or memory. Arbitration control bus 42 couples DMA controller 41 and central arbiter 48 to I/O slots 46 and disk adapter 82. By implementing a bus arbitration protocol, central arbiter 48 regulates access to expansion bus 44 by extension cards, controllers, and CPU 26. In addition, central arbiter 48 arbitrates for ownership of expansion bus 44 among the bus masters coupled to expansion bus 44. Bus master support allows multiprocessor configurations of expansion bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, keyboard/mouse controller 84, network adapter 85, modem 87, and parallel adapter 76. Display adapter 70 translates graphics data from CPU 26 into R, G, and B video signals utilized to drive display device 14. Depending upon the operating system and application software running, the visual output may include text, graphics, animation, and multimedia video. Disk adapter 82 controls the storage of data to and the retrieval of data from hard disk drive 24 and diskette drive 22. Disk adapter 82 handles tasks such as positioning the read/write heads within drives 22 and 23 and mediating between drives 22 and 23 and CPU 26. Nonvolatile RAM 14 stores system configuration data that describes the present configuration of data processing system 10.

Clock 72 is utilized by application programs executed by CPU 26 for time of day calculations. Serial adapter 78 provides a synchronous or asynchronous serial interface which enables data processing system 10 to communicate with a remote data processing system or peripheral device. Serial communication is governed by a serial communication protocol such as RS-232, RS-422, or the like. Timers 80 comprise multiple interval timers which may be utilized by application or operating system software to time one or more selected events within data processing system 10.

ROM 86 typically stores a basic input/output system (BIOS) which provides user-transparent I/O when CPU 26 is operating under the DOS operating system. BIOS also includes power on self-test (POST) diagnostic routines which perform system set up at power on. CD-ROM adapter 88 interfaces CD-ROM drive 24 with planar I/O bus 34 to support retrieval of data from an optical disk loaded within CD-ROM drive 24. Keyboard/mouse controller 84 interfaces system unit 12 with keyboard 16 and a graphical pointing device such as mouse 18.

Finally, system unit 12 includes network adapter 85, modem 87, and parallel adapter 76, which facilitate communication between data processing system 10 and peripheral devices or other data processing systems. Network adapter 85 is utilized to connect data processing system 10 to an unillustrated local area network (LAN) or other computer network. Modem 87 supports communication between data processing system 10 and another data processing system over a standard telephone line. Parallel port 76 transmits printer control signals and output data to printer 20 through a parallel port. At start up, a "bootstrap" or primary operating system loader is run to load segments of an operating system (OS) (not shown) into RAM 58 and launch execution of the operating system.

Generalizing, the computer used in the present invention is any personal computer or workstation client or server platform that is Intel®-, PowerPC®- or RISC-based, and that includes an operating system such as IBM® OS/2®, Microsoft Windows NT 4.0, Microsoft Windows 95, Windows 98, Unix, Linux, AIX®, OS/400 or the like. The computer may be connected for standalone operation or connected as part of a computer network.

According to the present invention, the composition of a given error message displayed to user on the display device 14 may be based upon system-defined local or state context information (in the usual manner) but may also be based on non-local contextual information. As used herein, non-local contextual information refers to information that a user or system administrator may define and that need not have any relationship to a particular operating state or context that exists or that is operating at the time of the particular error generation. If a current error has been defined with an associated non-local error context (or multiple contexts), the error message handler of the present invention composes, issues and/or displays an error message that is a function of the current error and the non-local contextual information (e.g., the error context). An error message may be a function of the current error and the error context in several different ways. Thus, for example, the error message may be a composite of the error message normally associated with the current error, together with additional information. Alternatively, the error message may be a function of the current error and the error context by simply refining or replacing the error message normally associated with the current error. In either case, preferably the current error condition and the non-contextual information associated therewith determine the composition of the given error message provided to the user. This technique provides far more useful information to the user as compared to conventional prior art error message display techniques.

Thus, according to the invention, there are different ways in which non-local contextual information may be used to "customize" a particular error message. Thus, for example, a prior error message may be used to refine a current error message. Alternatively, past user action(s) may be used to refine a current error message. In another alternative, time of day or other information may be used to augment a current error message. As an example, depending on the time of day of error occurrence, a particular error message may be provided indicating that the user's support/maintenance contract does not provide direct support whereas, at another time of day, e.g., the error message may be more specific and direct the user to a particular active telephone or email number.

Of course, the particular types, message content and message formats are not a limitation of the invention. The following, however, are several representative examples of the basic concepts of error messaging based on non-local contextual information. They are not to be taken by way of limitation.

1. A user tries to access a resource on node foo.tivoli.com and fails. The computer then generates a primary error message.

"Unknown node foo.tivoli.com"

The inventive application then searches an error log and notices that a similar error has been generated 4 times in the last 2 minutes. If that frequency matches a predetermined condition, the message is then augmented according to the present invention, e.g., to say:

"Unknown node foo.tivoli.com.

You seem to be having trouble looking up nodes today. Chances are that it is either a problem with your domain name service (DNS) or that you are misspelling the node name. Try the following technique to look up names you forget:

ypcat hosts|grep node-name-fragment"

2. A user brings up a Web browser and gets the error message "The automatic configuration file could not be loaded."

Assume then that the user ignores this message and continues by trying to connect to a desired Web site (e.g., requestedsite.com). A current error message, such as "The domain www.requestedsite.com does not respond. Server may be down", may then be displayed. The inventive application then searches the error log, notices the original error, and (if suitably programmed) then produces the following new error message:

"www.requestedsite.com does not respond. Server may be down.

When you started the program you got an error saying that the 'automatic configuration file could not be loaded'. This file is used to allow access to nodes outside of your firewall. Until you can load this file, you will only be able to access nodes inside your firewall."

3. A user tries to perform an operation and gets a severe error. The application checks the status of the user's support contract and produces the following new error message:

"Something really bad happened. Call 1-800-xxx-yyyy for assistance."

4. A user tries to perform an operation and gets a severe error. The computer system checks the current day and time and produces one of the following error messages:

Monday–Friday 9–5
"Something really bad happened.
Call the support line at 436-1234"
All other times
"Something really bad happened.
The support desk is closed but you can email a problem report to xxx@tivoli.com or check the FAQ at http://www.tivoli.com/doomed.html"

As these examples illustrate, given non-local context or state information is (usually predefined) and then, upon occurrence of a given error condition, used to compose a particular error message. The error message may be a custom message or a refined, augmented or modified version of an error message normally associated with the given error condition. In any event, the user is provided with much more useful information than would otherwise be the case in the event a simple local-based error message were returned.

Figure 3:
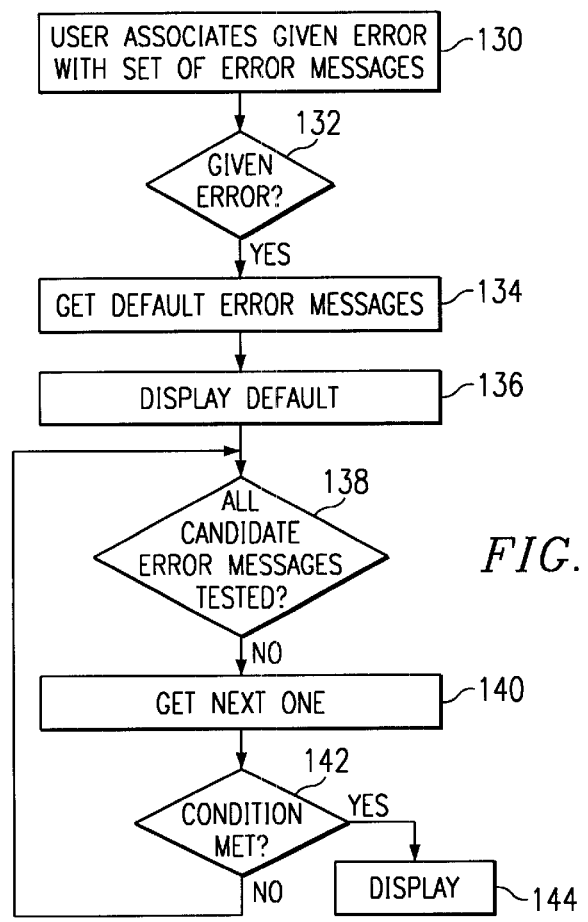
FIG. 3 is a flowchart illustrating a basic operating routine of the present invention for creation and display of non-local contextual error messages in a data processing system.

A representative flowchart of the inventive technique is shown in FIG. 3. It begins in step 130, usually in an off-line process, by having a user (e.g., a systems administrator, a programmer, or the like) associate a given error to a set of one or more error messages. A graphical user interface for this purpose is described in more detail below. Typically, each error message has associated therewith a given condition that must be met before the error message is displayed in response to occurrence of the given event. The given condition is preferably defined by the user but may also be defined by a third party or the system. A given condition is usually defined by non-local contextual information. In a preferred implementation, the association of the set of error messages to the given event, as well as the definition of the given condition with a particular error message of the set, is done using a GUI mapper and associated control routine to be described in more detail below.

Once the given error has been associated with its set of error messages that may be generated (upon occurrence of the error), the routine continues. Further steps take place, of course, during interaction with a given system, resource or application on the computer that may trigger occurrence of the given error. At step 132 then, the routine tests continually to determine whether there has been an occurrence of the given error condition. If not, the routine cycles. If, however, the given error condition has been triggered, the routine continues at step 134 to fetch a current or "default" error message. At step 136, the routine optionally displays the "default" error message. At step 138, the routine tests whether all error messages (so-called "candidate error messages") in the set have been tested. If not, the routine gets a next candidate error message from the set of error messages defined for the given error. It then checks at step 142 whether the given condition associated with the next candidate error message has been met. This was the condition (i.e. the non-local context) defined during the GUI setup routine. If the outcome of step 142 is positive, the routine branches to step 144 and displays the error message, either alone or with the default error message. In particular, depending on the given condition, the error message displayed may be a refined version of the default error message (in which case the default may not be displayed), an augmented version of the default error message (in which case the default likely will be displayed), a variation of the default error message, a substitute error message, or the like. If, however, the outcome of the test at step 142 is negative, the given condition defined for the candidate error message under test has not been met. Thus, the routine returns to step 138 and loops.

Thus, upon occurrence of the given error, the set of error messages associated with that error are examined. If a particular error message's given condition is met, that message is displayed, for example, as an adjunct to or in lieu of the default message.

Figure 4:
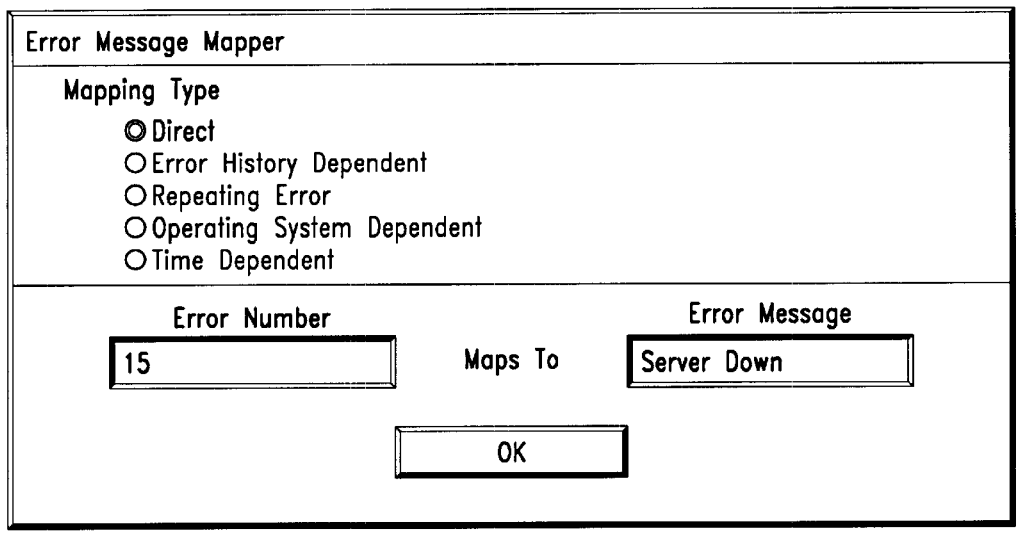
FIG. 4 illustrates a representative error message mapper display screen displayed when the user selects a "direct" mapping option.
Figure 5:
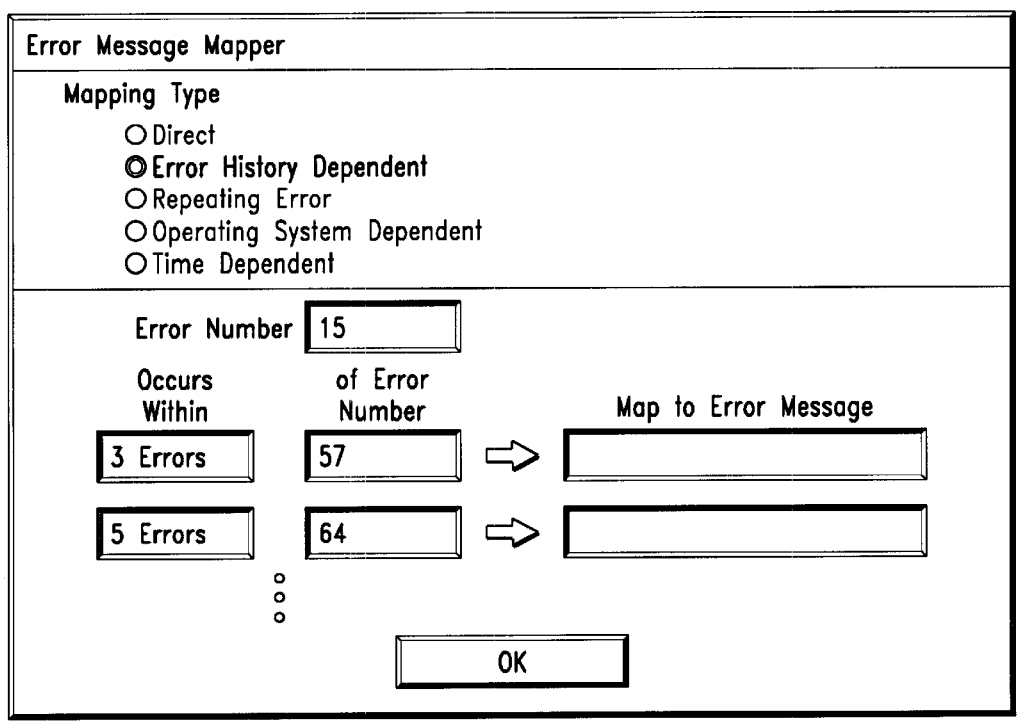
FIG. 5 illustrates a representative error message mapper display screen displayed when the user selects an "error history dependent" mapping option.
Figure 6:
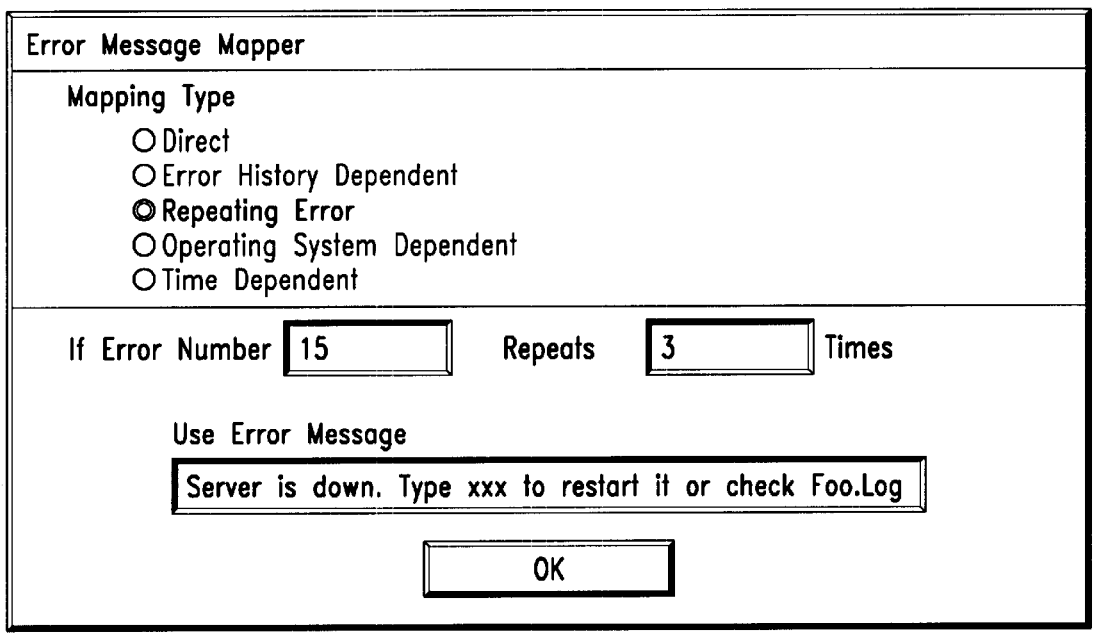
FIG. 6 illustrates a representative error message mapper display screen displayed when the user selects a "repeating error" mapping option.
Figure 7:
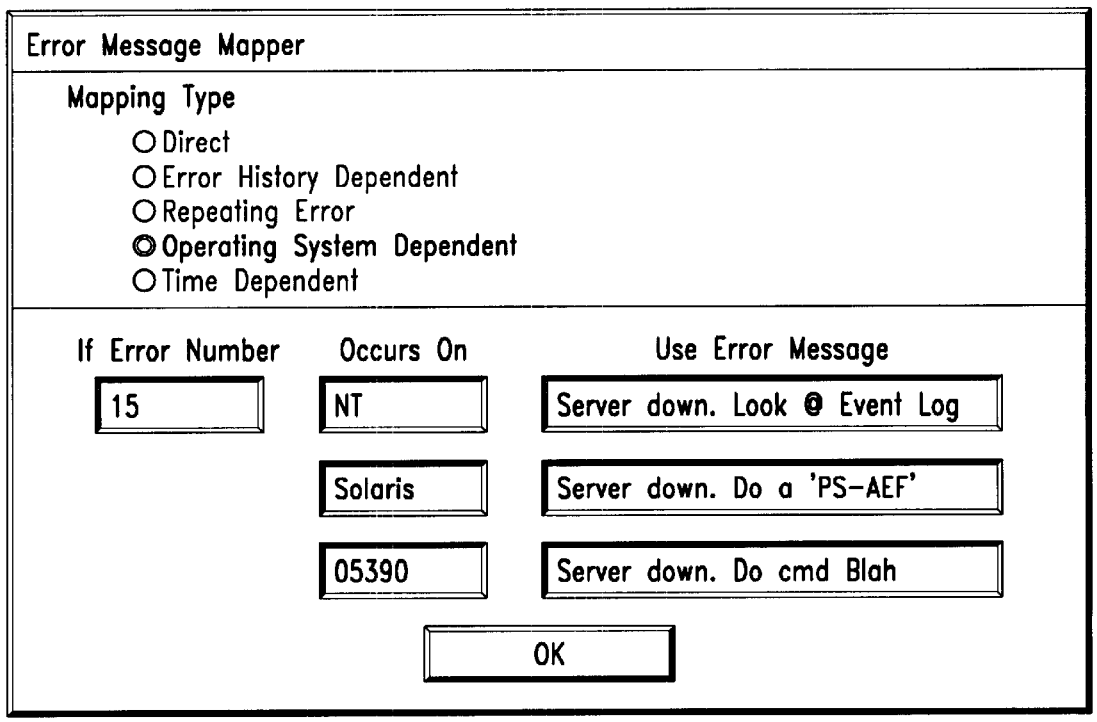
FIG. 7 illustrates a representative error message mapper display screen displayed when the user selects an "operating system dependent" mapping option.

FIGS. 4–7 illustrate representative error message mapper display screens that are displayed when the user selects various mapping type options. These screens are, of course, selectable from a conventional GUI menu in a known manner. FIG. 4 illustrates a "direct" mapping option, FIG. 5 illustrates an "error history dependent" mapping option, FIG. 6 illustrates a "repeating error" mapping option, and FIG. 7 illustrates an "operating system dependent" mapping option. FIGS. 4–5 represent the preferred techniques for composing error messages using non-contextual information according to the present invention. All of the above, however, are merely representative.

Thus, in FIG. 4, if the user selects the direct mapping type option (e.g., by clicking in the button), the screen opens up with a dialog box 200 that includes an error number field 202, an error message field 204 and an OK button 206. The user then associates a given error number entered in the error number field 202 with a given error message entered in the error message field 204, and then clicks OK.

In FIG. 5, selection of the error history dependent option opens the dialog box 208 having the error number field 202 and a plurality of error message fields 104. An "occurs within" field 210 is used to associate a given number of entries (as defined by the user) with another error number as defined by the "of error number" field 212 to thereby map the error number (entered in field 202) to a given error message (entered in the field 204) based on the conditions set forth in fields 210 and 212. Thus, in this example, if error number 15 occurs within 3 errors of error number 57, a particular first error message is given. If, however, error number 15 occurs within 5 errors of error number 64, another error message is given. When the user is satisfied with the definitions, the OK button is selected.

FIG. 6 illustrates use of the error message mapper to input a "repeating error" type function. In this case, selection of the "repeating error" type button opens the dialog box 214 which includes the error number field 202, a repeat field 216, the error message field 204, and the OK button 206. Here, the user enters the error number in field 202, a repetition constraint in field 216, and the appropriate error message in field 204. Thus, in this example, if error number 15 repeats 3 times, an error message states the "server is down; type xxx to restart it or check foo.log." When the user is satisfied with the dialog, he or she selects OK.

FIG. 7 illustrates how the error message mapper is used to create an operating system dependent error message. When the user selects this option, dialog box 120 opens to reveal the error number field 202, an "occurs on" field 222, and the associated error message field 204. The user then fills in the appropriate information and checks OK. In this example, if error number 15 occurs on a Windows NT box (for example), an error message states the "server is down, look @ event log". If error 15 occurs on a Solaris-based machine (for example), the error message states the "server is down do a 'ps-aef'", and so on for the other identified condition.

Thus, by using one or more of the various screens, a set of error messages are associated with a given error (in the above case, error 15). In the above examples, each of the error mappers is used to associate a given error message with error 15, although this is not a requirement of course. A given error may merely be mapped to a single error message or set of error messages (via a single error mapper template), or a given error message may be mapped to a number of different error permutations across multiple error mapper templates. Of course, the representative error mapper templates illustrated are merely exemplary and may be customized as desired or as otherwise convenient dependent on the type of errors, users or administrators. If desired, a given error message templates may be generated "on the fly" after particular errors have been repeated and tend to require similar corrective action. Thus, the set of error mapper templates should be considered dynamically-variable.

It may also be desirable, upon occurrence of a given error, to provide a user with a dialog box to determine whether a custom error message may be generated in the future upon the subsequent occurrence of the same error. Thus, the template approach illustrated above may also be effected during use of the system as well.

One of ordinary skill in the art will appreciate that the present invention provides numerous advantages over the prior art. Foremost, the invention provides a method for composing and displaying unique error messages based on a current error condition and its relationship to non-local contextual information such as an error history, i.e. one or more previous error conditions. The previous error condition (s) may be the same type as the current error condition or a different type.

The present invention thus provides the important advantage of enabling the composition and display of an error message that has some specialized context for the user. Typically, the error message is a function of the current error condition and previous error conditions, e.g., an event history stream. Traditionally, prior art error message subsystems received only one static input, namely, the error number, and then produced a corresponding output. With the present invention, varying non-local contextual information is automatically provided as the input to the error message subsystem, together with the current error condition. These inputs control the error message subsystem to generate a more useful error message according to the present invention.

The error mapper interface preferably associates a given error condition to the non-local contextual information. This interface may be modified to enable more complex associations to be applied and used to drive the error message subsystem.

As noted above, the inventive error message handler (which may be an adjunct to or part of an error message system) is preferably a computer program. This handler generates the error message mapper interface and the composition of the error messages as previously described. Thus, one of the preferred implementations of the invention is as a set of instructions (program code) in a code module resident in the random access memory of the computer. Until required by the computer, the set of instructions may be stored in another computer memory, for example, in a hard disk drive, or in a removable memory such as an optical disk (for eventual use in a CD-ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As described above, aspects of the present invention pertain to specific "method steps" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 86 or optical disks readable by CD-ROM drive 24); (b) information alterably stored on writable storage media (e.g., floppy disks within diskette drive 22 or hard disk drive 24); or (c) information conveyed to a computer through communication media, such as through a computer or telephone network. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. In a computer system, a method comprising the steps of:
    associating non-local contextual information with a triggering error event, wherein the non-local contextual information defines a first error condition and an associated first error message;
    detecting a current error event, wherein the current error event has an associated current error event message;
    if the current error event is the triggering error event, determining whether the first error condition is met, wherein the first error condition is met by an occurrence or operating state other than the current error event message; and
    composing an output error message from the first error message if the first error condition is met.

2. The method as described in claim 1 wherein the first error condition is given number of repetitions of the current error event.

3. The method as described in claim 2 wherein the given number is selectable.

4. The method as described in claim 1 wherein the first error condition is a prior error event having a given relationship to the current error event.

5. The method as described in claim 4 wherein the given relationship is that the current error event occurs within a predetermined number of errors of the prior error event.

6. The method as described in claim 5 wherein the predetermined number of errors is selectable.

7. The method as described in claim 4 wherein the prior error event is selectable.

8. The method as described in claim 1 wherein the output error message is a composite of a first portion and a second portion.

9. The method as described in claim 8 wherein the first portion is an error message normally associated with the current error event and the second portion is given information to assist a user to address the current error event.

10. The method as described in claim 1 further including the step of displaying the output error message to a user of the computer system.

11. The method as described in claim 1 wherein the non-local contextual information includes historical information about the triggering error event.

12. The method as described in claim 1 wherein the non-local contextual information includes historical information about the triggering error event and at least one other error event.

13. The method as described in claim 1 wherein the non-local contextual information includes information about a configuration of the computer system.

14. The method as described in claim 1 wherein the non-local contextual information includes time-of-day information.

15. The method as described in claim 1 wherein the non-local contextual information further defines a second error condition and an associated second error message; and wherein the method further comprises the steps of:

determining whether the second error condition is met if the first error condition is not met; and composing an output error message from the second error message if the second error condition is met.

16. The method as described in claim 1 wherein the associating step includes receiving input from a user interface for mapping the triggering error event to a set of one or more conditions and associated error messages.

17. A computer program product in a computer-readable medium for composing error messages in a data processing system having a display, comprising:

means for associating non-local contextual information with a triggering error event, wherein the non-local contextual information defines a first error condition and an associated first error message;

means for determining whether a current error event is the triggering error event, wherein the current error event has an associated current error event message;

means for determining whether the first error condition is met if the current error event is the triggering error event, wherein the first error condition is met by an occurrence or operating state other than the current error event message; and means for composing an output error message from the first error message if the first error condition is met.

18. The computer program product as described in claim 17 further including means for creating an association between the current error event and a prior error event.

19. The computer program product as described in claim 17 wherein the means for associating includes a user interface for mapping the triggering error event to a set of one or more conditions and associated error messages.

20. The computer program as described in claim 17 wherein the non-local contextual information includes historical information about the triggering error event.

21. The computer program product as described in claim 17 wherein the non-local contextual information includes historical information about the triggering error event and at least one other error event.

22. The computer program product as described in claim 17 wherein the non-local contextual information includes information about a configuration of the computer system.

23. The computer program product as described in claim 17 wherein the non-local contextual information includes time-of-day information.

24. The computer program product as described in claim 17 wherein the non-local contextual information further defines a second error condition and an associated second error message; and wherein the application further comprises:

means for determining whether the second error condition is met if the first error condition is not met; and means for composing an output error message from the second error message if the second error condition is met.

25. A computer, comprising:

a processor;

an operating system;

an application for composing and displaying error messages on a display, comprising:

means for associating non-local contextual information with a triggering error event, wherein the non-local contextual information defines a first error condition and an associated first error message;

means for determining whether a current error event is the triggering error event, wherein the current error event has an associated current error event message;

means for determining whether the first error condition is met if the current error event is the triggering error event, wherein the first error condition is met by an occurrence or operating state other than the current error event message; and means for composing an output error message from the first error message if the first error condition is met.

26. The computer as described in claim 25 wherein the associating means includes a user interface for mapping the triggering error event to a set of one or more conditions and associated error messages.

27. The computer as described in claim 25 further including the step of displaying the output error message to a user of the computer.

28. The computer as described in claim 25 wherein the non-local contextual information includes historical information about the triggering error event.

29. The computer as described in claim 25 wherein the non-local contextual information includes historical information about the triggering error event and at least one other error event.

30. The computer as described in claim 25 wherein the non-local contextual information includes information about a configuration of the computer system.

31. The computer as described in claim 25 wherein the non-local contextual information includes time-of-day information.

\* \* \* \* \*